(12) United States Patent
Kim (10) Patent No.: US 12,234,874 B2
(45) Date of Patent: Feb. 25, 2025

(54) ELECTRONIC PARKING BRAKE SYSTEM AND CONTROL METHOD THEREOF

(71) Applicant: HL MANDO CORPORATION, Gyeonggi-do (KR)

(72) Inventor: Kangweon Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 373 days.

(21) Appl. No.: 17/720,284

(22) Filed: Apr. 13, 2022

(65) Prior Publication Data

US 2022/0341478 A1 Oct. 27, 2022

(30) Foreign Application Priority Data

Apr. 23, 2021 (KR) .................. 10-2021-0053082

(51) Int. Cl.
| | |
|---|---|
| *F16D 65/18* | (2006.01) |
| *B60T 8/171* | (2006.01) |
| *F16D 121/24* | (2012.01) |
| *F16D 125/40* | (2012.01) |
| *F16D 127/06* | (2012.01) |

(52) U.S. Cl.
CPC .......... *F16D 65/18* (2013.01); *F16D 2121/24* (2013.01); *F16D 2125/40* (2013.01); *F16D 2127/06* (2013.01)

(58) Field of Classification Search
CPC .. F16D 65/18; F16D 2121/24; F16D 2125/40; F16D 2127/06; B60T 13/741; B60T 8/171
See application file for complete search history.

(56) References Cited

U.S. PATENT DOCUMENTS

| | | | | |
|---|---|---|---|---|
| 9,956,947 | B2* | 5/2018 | Nishikawa | B60T 13/741 |
| 10,962,071 | B2* | 3/2021 | Chung | B60T 13/74 |
| 10,974,711 | B2* | 4/2021 | Choe | F16D 65/18 |
| 11,970,150 | B2* | 4/2024 | Namgung | B60W 10/182 |
| 2016/0244042 | A1* | 8/2016 | Nishikawa | F16D 65/18 |
| 2018/0126973 | A1* | 5/2018 | Choe | F16D 55/226 |
| 2020/0166096 | A1* | 5/2020 | Chung | B60T 13/741 |

(Continued)

FOREIGN PATENT DOCUMENTS

| | | | | |
|---|---|---|---|---|
| JP | 2006232259 | A * | 9/2006 | ............ B60T 13/741 |
| KR | 6080669 | | 2/2017 | |
| KR | 10-1914127 | | 11/2018 | |

*Primary Examiner* — Thomas W Irvin
(74) *Attorney, Agent, or Firm* — WOMBLE BOND DICKINSON (US) LLP (57) ABSTRACT

Disclosed is an electronic parking brake system including a piston provided to press a pair of brake pads disposed on opposite sides of a brake disk rotating together with a wheel of a vehicle, a nut member provided to press the piston, a spindle member provided to move the nut member, an electric motor provided to rotate the spindle member, an H-bridge having a pair of high-side switching elements and a pair of low-side switching elements to rotate the electric motor in a forward or backward direction, and a controller electrically connected to the H-bridge, wherein the controller is configured to detect a back electromotive force of the electric motor in a motor lock inspection mode for inspecting a lock failure of the electric motor and determine the lock failure of the electric motor based on a change in the detected back electromotive force.

9 Claims, 9 Drawing Sheets

(56) References Cited

U.S. PATENT DOCUMENTS

| | | | |
|---|---|---|---|
| 2020/0247380 A1* | 8/2020 | Baehrle-Miller | F16D 55/226 |
| 2021/0188228 A1* | 6/2021 | Lee | B60T 8/171 |
| 2022/0399849 A1* | 12/2022 | Kim | F16D 65/183 |
| 2023/0051728 A1* | 2/2023 | Namgung | B60W 10/18 |
| 2023/0064663 A1* | 3/2023 | Kim | B60T 17/22 |
| 2024/0149844 A1* | 5/2024 | Kim | B60T 8/24 |
| 2024/0157917 A1* | 5/2024 | Kobune | B60T 13/746 |

\* cited by examiner

ELECTRONIC PARKING BRAKE SYSTEM AND CONTROL METHOD THEREOF

CROSS-REFERENCE TO RELATED APPLICATION(S)

This application is based on and claims priority under 35 U.S.C. § 119 to Korean Patent Application No. 10-2021-0053082, filed on Apr. 23, 2021, in the Korean Intellectual Property Office, the disclosure of which is incorporated by reference herein in its entirety.

BACKGROUND

1. Field

The disclosure relates to a motor-on-caliper (MoC) type electronic parking brake system that integrates and operates a motor with a caliper mounted on a wheel of a vehicle, and a control method thereof.

2. Description of the Related Art

In general, an electronic parking brake system increases a torque that is generated from a motor, through a speed reducer to generate a clamping force required for parking by a mechanical structure device inside a caliper.

The electronic parking brake system uses an H-bridge circuit to rotate the motor in a forward or backward direction.

Motor failures may be divided into electrical failures such as short circuit and disconnection, and mechanical failures such as motor stuck. There is motor lock among the mechanical failures of motors. The motor lock refers to a state in which the motor may not rotate because a rotor is locked due to bearing stuck, coil burnout, or abnormal operation.

When such motor lock occurs, an overcurrent may occur and the H-bridge circuit may be damaged. Therefore, a safety mechanism is implemented to detect and deal with the motor lock.

Conventionally, a current sensor is used to detect the motor lock. However, in a case in which the current sensor is used, it may be difficult for a product to be miniaturized, and a manufacturing cost may increase. In addition, in a case in which the motor lock is to be detected only by the current sensor, the motor lock may not be detected when the current sensor fails.

Korean Patent Publication No. 10-2013-0057883 published on Jun. 3, 2013 has been disclosed as an example of a conventional electronic parking brake system.

SUMMARY

It is an aspect of the disclosure to provide an electronic parking brake system capable of reliably detecting a motor lock without relying on a current sensor, and a control method thereof.

Additional aspects of the disclosure will be set forth in part in the description which follows and, in part, will be obvious from the description, or may be learned by practice of the disclosure.

In accordance with an aspect of the disclosure, an electronic parking brake system including a piston provided to press a pair of brake pads disposed on opposite sides of a brake disk rotating together with a wheel of a vehicle, a nut member provided to press the piston, a spindle member provided to move the nut member, an electric motor provided to rotate the spindle member, an H-bridge having a pair of high-side switching elements and a pair of low-side switching elements to rotate the electric motor in a forward or backward direction, and a controller electrically connected to the H-bridge, wherein the controller is configured to detect a back electromotive force of the electric motor in a motor lock inspection mode for inspecting a lock failure of the electric motor and determine the lock failure of the electric motor based on a change in the detected back electromotive force.

The controller may be configured to selectively turn on any one of the pair of high-side switching elements and the pair of low-side switching elements of the H-bridge in the motor lock inspection mode so that a current circulates through the turned-on switching elements and the electric motor.

The controller may be configured to initiate the motor lock inspection mode after completing driving of the electric motor for parking operation or parking release.

The controller may be configured to determine as the lock failure of the electric motor when a slope of the detected back electromotive force is greater than a preset slope.

The controller may be configured to, after completing driving of the electric motor for parking operation or parking release, selectively turn on any one of the pair of high-side switching elements and the pair of low-side switching elements, and at the same time detect the back electromotive force of the electric motor, and determine the lock failure of the electric motor based on the change in the detected back electromotive force.

In accordance with an aspect of the disclosure, a control method of an electronic parking brake system, which includes a piston provided to press a pair of brake pads disposed on opposite sides of a brake disk rotating together with a wheel of a vehicle, a nut member provided to press the piston, a spindle member provided to move the nut member, an electric motor provided to rotate the spindle member, and an H-bridge having a pair of high-side switching elements and a pair of low-side switching elements to rotate the electric motor in a forward or backward direction, includes detecting a back electromotive force of the electric motor in a motor lock inspection mode for inspecting a lock failure of the electric motor, and determining the lock failure of the electric motor based on a change in the detected back electromotive force.

The control method may further include selectively turning on any one of the pair of high-side switching elements and the pair of low-side switching elements of the H-bridge in the motor lock inspection mode so that a current circulates through the turned-on switching elements and the electric motor.

The detecting of the back electromotive force of the electric motor may include initiating the motor lock inspection mode after completing driving of the electric motor for parking operation or parking release.

The determining of the lock failure of the electric motor may include determining as the lock failure of the electric motor when a slope of the detected back electromotive force is greater than a preset slope.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like reference numerals refer to like elements throughout the specification. This specification does not describe all the elements of the embodiments, and duplicative contents between general contents or embodiments in the technical field of the present disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being "connected" to another part, it includes not only a direct connection but also an indirect connection, and the indirect connection includes connecting through a wireless network.

Also, when it is described that a part "includes" an element, it means that the element may further include other elements, not excluding the other elements unless specifically stated otherwise.

Throughout the specification, when a member is described as being "on" another member, this includes not only a case in which a member is in contact with another member but also a case in which another member is present between the two members.

The terms 'first,' 'second,' etc. are used to distinguish one element from another element, and the elements are not limited by the above-mentioned terms. The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

Figure 1:
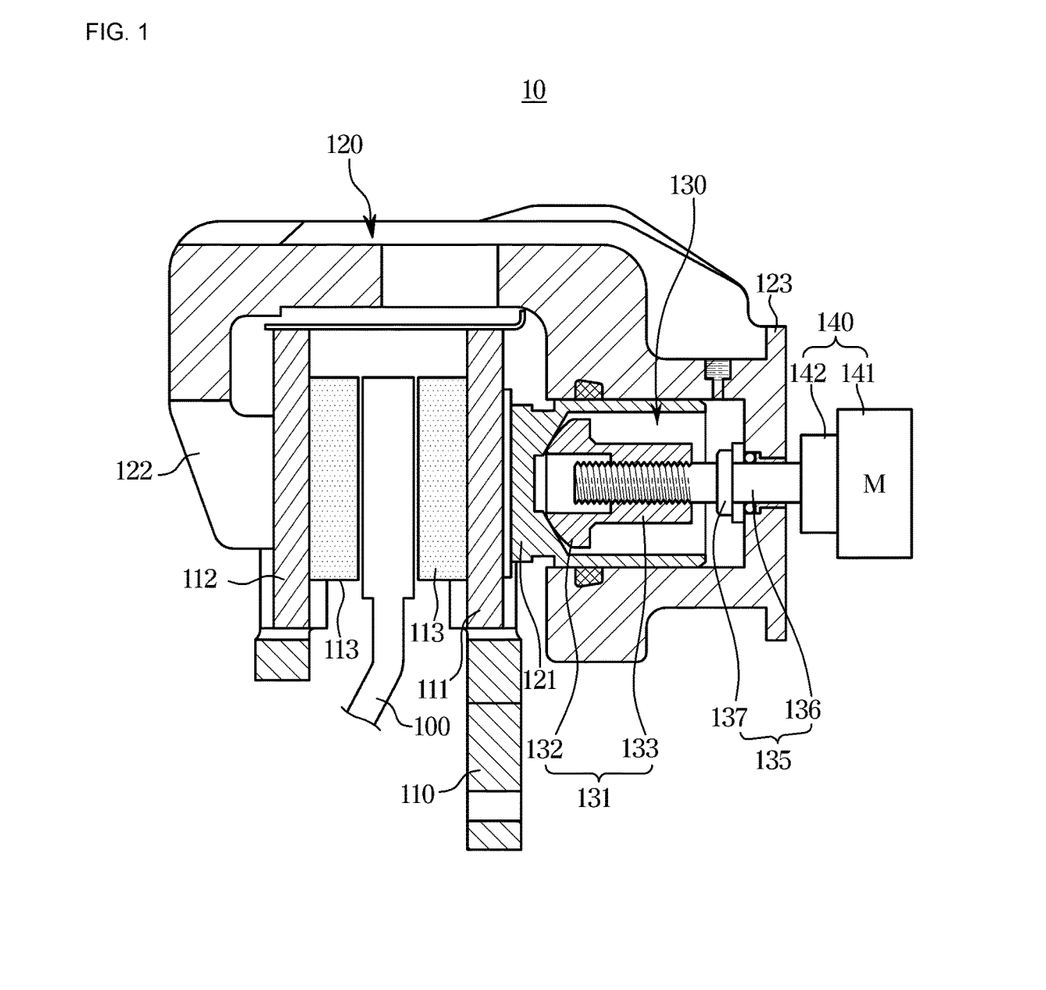
FIG. 1 is a configuration view of an electronic parking brake (EPB) of an electronic parking brake system according to an embodiment.

FIG. 1 is a configuration view of an electronic parking brake (EPB) of an electronic parking brake system according to an embodiment.

Referring to FIG. 1, an electronic parking brake 10 may include a carrier 110 on which a pair of pad plates 111 and 112 are installed to be movable forward or backward to press a brake disk 100 rotating together with a wheel of a vehicle, a caliper housing 120 provided with a cylinder 123 slidably installed on the carrier 110 and in which a piston 121 is installed to move forward or backward by a braking hydraulic pressure, a power conversion unit 130 that presses the piston 121, and a motor actuator 140 to transmit a rotational force to the power conversion unit 130 using a motor M.

The pair of pad plates 111 and 112 include the inner pad plate 111 disposed to contact the piston 121 and the outer pad plate 112 disposed to contact a finger portion 122 of the caliper housing 120. The pair of pad plates 111 and 112 are installed on the carrier 110 fixed to a vehicle body so as to be movable forward or backward toward opposite sides of the brake disk 100. In addition, a brake pad 113 is attached to one surface of each of the pad plates 111 and 112 facing the brake disk 100.

The caliper housing 120 is slidably installed on the carrier 110. More specifically, the caliper housing 120 includes the cylinder 123 provided at a rear portion and in which the power conversion unit 130 is installed and the piston 121 is provided to be movable forward and backward, and the finger portion 122 provided at a front portion and formed to be bent in a downward direction to operate the outer pad plate 112. The finger portion 122 and the cylinder 123 are formed integrally.

The piston 121 is provided in a cylindrical form having a cup shape to be slidably inserted into the cylinder 123. The piston 121 presses the inner pad plate 111 toward the brake disk 100 by an axial force of the power conversion unit 130 to which the rotational force of the motor actuator 140 is transmitted. Accordingly; when the axial force of the power conversion unit 130 is applied, the piston 121 moves forward toward the inner pad plate 111 to press the inner pad plate 111, and the caliper housing 120 operates in a direction opposite to the piston 121 by a reaction force, so that the finger portion 122 presses the outer pad plate 112 toward the brake disk 100 to perform braking.

The power conversion unit 130 may serve to press the piston 121 toward the inner pad plate 111 by the rotational force transmitted from the motor actuator 140.

The power conversion unit 130 may include a nut member 131 installed so as to be disposed in the piston 121 and in contact with the piston 121, and a spindle member 135 screwed to the nut member 131.

The nut member 131 may be disposed in the piston 121 in a state in which rotation is restricted to be screwed with the spindle member 135.

The nut member 131 may include a head portion 132 provided to be in contact with the piston 121, and a coupling portion 133 formed to extend from the head portion 132 and having female threads formed on an inner circumferential surface thereof to be screwed with the spindle member 135.

The nut member 131 may move in a forward direction or a backward direction depending on the rotation direction of the spindle member 135 to serve to press and release the piston 121. In this case, the forward direction may be a moving direction in which the nut member 131 approaches the piston 121. The backward direction may be a moving direction in which the nut member 131 becomes away from the piston 121. In addition, the forward direction may be a moving direction in which the piston 121 approaches the brake pad 113. The backward direction may be a moving direction in which the piston 121 becomes away from the brake pad 113.

The spindle member 135 may include a shaft portion 136 provided to pass through the rear portion of the caliper housing 120 to be rotated by the rotational force transmitted from the motor actuator 140, and a flange portion 137 formed to extend in a radial direction from the shaft portion 136. One side of the shaft portion 136 may be rotatably installed through a rear side of the cylinder 123, and the other side of the shaft portion 136 may be disposed in the piston 121. In this case, one side of the shaft portion 136 passing through the cylinder 123 is connected to an output shaft of a speed reducer 142 to receive the rotational force of the motor actuator 140.

The motor actuator 140 may include an electric motor 141 and the speed reducer 142.

The electric motor 141 may press or release the piston 121 by moving the nut member 131 forward or backward by rotating the spindle member 135.

The speed reducer 142 may be provided between an output side of the electric motor 141 and the spindle member 135.

Through the configuration as described above, the electronic parking brake 10 may move the nut member 131 by rotating the spindle member 135 in one direction using the motor actuator 140 to press the piston 121 in a parking operation mode. The piston 121 pressed by the movement of the nut member 131 presses the inner pad plate 111 to come the brake pad 113 into close contact with the brake disk 100, thereby generating a clamping force.

In addition, the electronic parking brake 10 rotates the spindle member 135 in the opposite direction using the motor actuator 140 in a parking release mode, so that the nut member 131 pressed against the piston 121 may move backward. The pressing against the piston 121 may be released by the backward movement of the nut member 131. When the pressing against the piston 121 is released, the clamping force generated by the brake pad 113 being separated from the brake disk 100 may be released.

Figure 2:
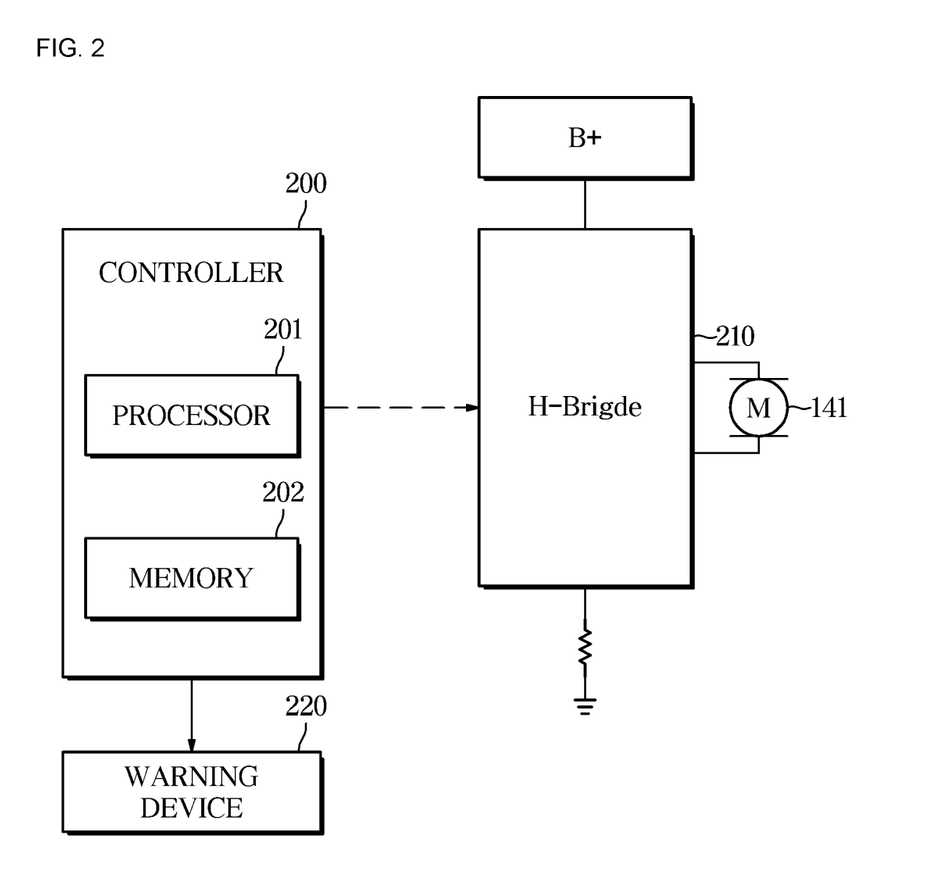
FIG. 2 is a control block diagram of the electronic parking brake system according to an embodiment.
Figure 3:
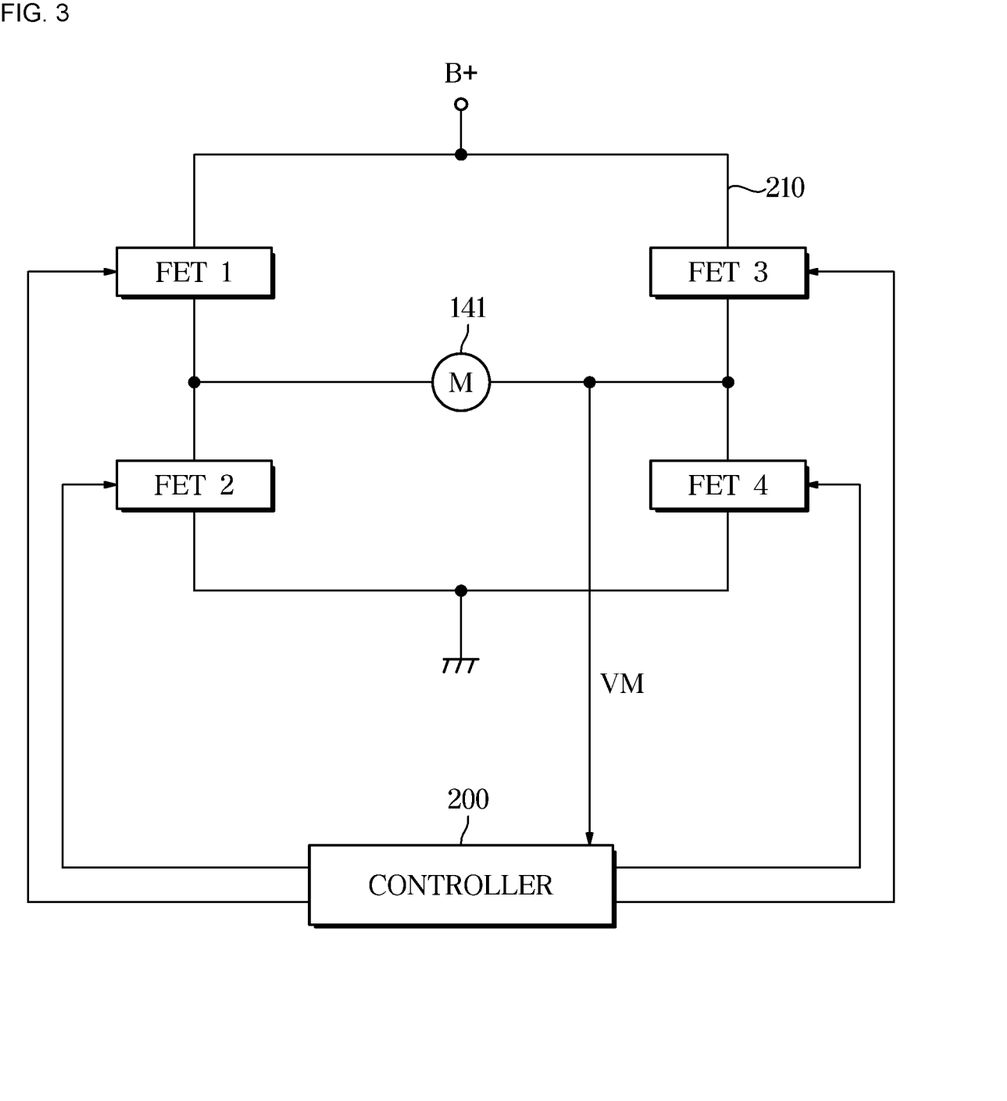
FIG. 3 is a circuit diagram for driving the EPB of the electronic parking brake system according to an embodiment.

FIG. 2 is a control block diagram of the electronic parking brake system according to an embodiment, and FIG. 3 is a circuit diagram for driving the EPB of the electronic parking brake system according to an embodiment.

Referring to FIGS. 2 and 3, the electronic parking brake system may include a controller 200 configured to perform overall control.

An H-bridge 210 that is a motor driving circuit for driving the electric motor 141 of the EPB 10 is electrically connected to an output side of the controller 200. For example, the EPB 10 may be provided on a left rear wheel and/or a right rear wheel.

The H-bridge 210 may rotate the electric motor 141 in the forward or backward direction in response to a control signal of the controller 200. For example, the H-bridge 210 may include four switching elements FET1 to FET4 to rotate the electric motor 141 in the forward or backward direction.

The controller 200 supplies a motor power supply B+ to the electric motor 141 by controlling each of the switching elements FET1 to FET4 of the H-bridge 210 to be turned on or off, thereby rotating the electric motor 141 in the forward or backward direction.

The first switching element FET1 on a high side and the second switching element FET2 on a low side in a half-bridge on one side of the H-bridge 210 are connected in series. A drain of the first switching element FET1 is connected to the motor power supply B+, and a source of the second switching element FET2 is grounded.

Also, the third switching element FET3 on the high side and the fourth switching element FET4 on the low side in the half-bridge on the other side of the H-bridge 210 are connected in series. A drain of the third switching element FET3 is connected to the motor power supply B+, and a source of the fourth switching element FET4 is grounded.

One side of the electric motor 141 is connected to a midpoint between the first switching element FET1 and the second switching element FET2, and the other side of the electric motor 141 is connected to a midpoint between the third switching element FET3 and the fourth switching element FET4.

A warning device 220 may be electrically connected to the output side of the controller 200.

The warning device 220 may warn a driver of a motor failure related to the lock of the electric motor 141. When a plurality of the H-bridges 210 is provided, the warning device 220 may warn the driver of information related to stop of the operation of the motor driving circuit in response to the electric motor 141 in which the motor lock has occurred. The warning device 220 is implemented as a visual configuration such as a warning lamp or an audible configuration such as a buzzer that is installed at a suitable place inside the vehicle, so that the warning lamp or buzzer may be operated in response to a control signal of the controller 200 to warn the driver of the motor lock. A speaker may be used as the warning device 220 of an audible configuration, and as such a speaker, a speaker of a car audio system provided inside the vehicle or a separate speaker provided at a suitable place inside the vehicle may be used.

The controller 200 may receive a terminal voltage VM of the electric motor 141. The controller 200 may recognize the voltage of the electric motor 141 by receiving a terminal voltage signal of the electric motor 141. The controller 200 may also receive the voltage of the electric motor 141 through a voltage sensor provided to detect the voltage of the electric motor 141.

The controller 200 may be referred to as an electronic control unit (ECU).

The controller 200 may include a processor 201 and a memory 202.

The memory 202 may store a program for processing or controlling the processor 201 and various data for the operation of the electronic parking brake system.

The memory 202 may include a non-volatile memory such as a flash memory, a read only memory (ROM), and an erasable programmable read only memory (EPROM), as well as a volatile memory such as S-RAM and D-RAM.

The processor 202 may control the overall operation of the electronic parking brake system.

The controller 200 having the above configuration may perform the parking operation mode or the parking release mode by an operation signal of a parking switch operated by the driver or an operation signal generated by the program related to the operation of the electronic parking brake.

In the parking operation mode, the controller 200 may perform a parking operation (Parking Apply) of generating a clamping force required for parking by making close contact of the brake pad of the wheel with the brake disk using EPB 10.

In the parking release mode, the controller 200 may perform a Parking Release of releasing the generated clamping force by releasing the brake pad in close contact with the brake disk of the wheel using the EPB 10.

The controller 200 may determine a clamping force required for parking, determine a target current according to the determined clamping force, and control the electric motor 141 of the EPB 10 according to the determined target current.

The controller 200 may determine whether the motor lock occurs based on a back electromotive force of the electric motor 141 in a motor lock inspection mode.

Figure 4:
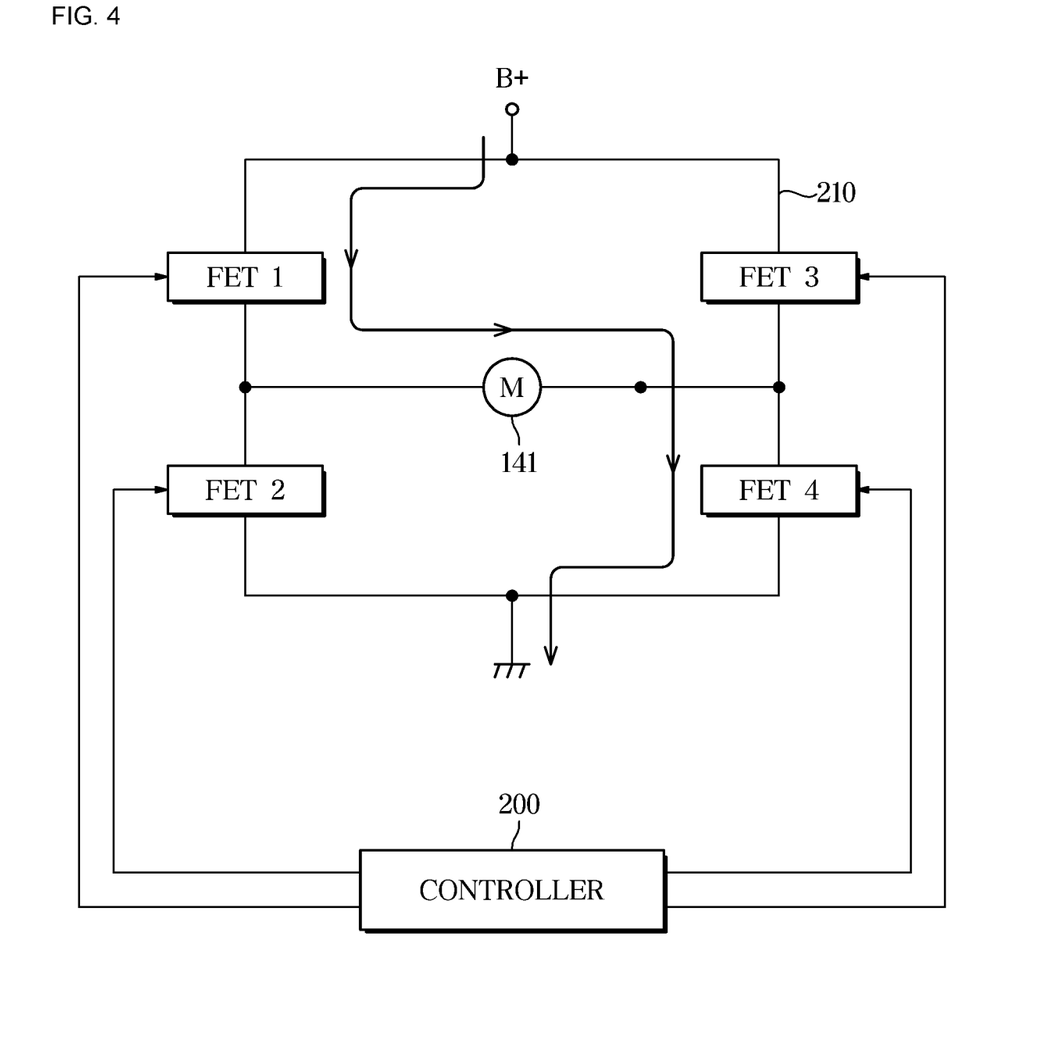
FIG. 4 is a circuit operation diagram when a motor rotates in a forward direction in the electronic parking brake system according to an embodiment.

FIG. 4 is a circuit operation diagram when a motor rotates in a forward direction in the electronic parking brake system according to an embodiment.

Referring to FIG. 4, in the parking operation mode, the controller 200 may rotate the electric motor 141 in the forward direction by turning on the first switching element FET1 and the fourth switching element FET4 of the H-bridge 210 and turning off the second switching element FET2 and the third switching element FET3 of the H-bridge 210. Arrows shown in FIG. 4 indicate current flows flowing through the first switching element FET1, the electric motor 141, and the fourth switching element FET4.

Figure 5:
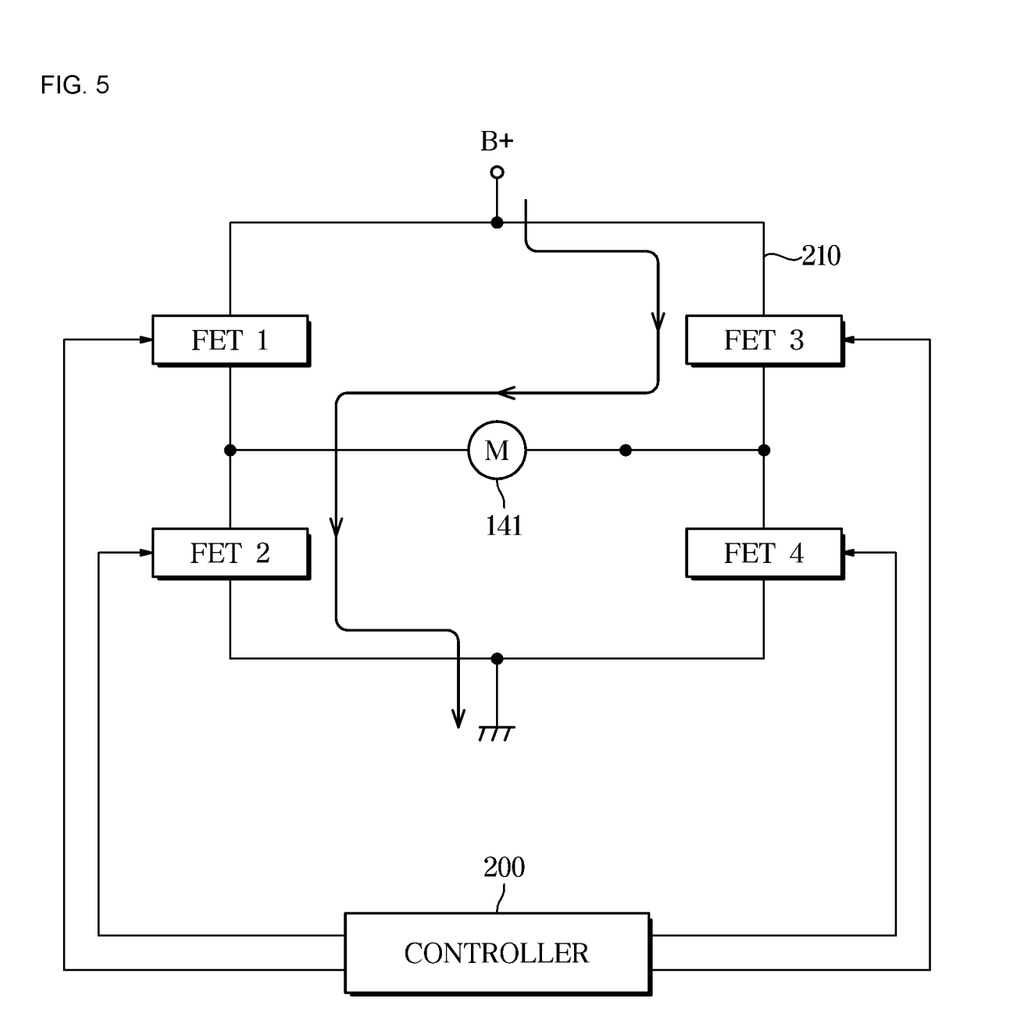
FIG. 5 is a circuit operation diagram when the motor rotates in a backward direction in the electronic parking brake system according to an embodiment.

FIG. 5 is a circuit operation diagram when the motor rotates in a backward direction in the electronic parking brake system according to an embodiment.

Referring to FIG. 5, in the parking release mode, the controller 200 may, in contrast to the parking operation mode, rotate the electric motor 141 in the backward direction by turning on the second switching element FET2 and the third switching element FET3 of the H-bridge 210 and turning off the first switching element FET1 and the fourth switching element FET4 of the H-bridge 210. Arrows shown in FIG. 5 indicate current flows flowing through the third switching element FET3, the electric motor 141, and the second switching element FET2.

In the parking operation mode in which the electric motor 141 rotates in the forward direction by the H-bridge 210, the forward rotation of the electric motor 141 may be decelerated through the speed reducer 142 to rotate the spindle member 135 in one direction with a large force. When the spindle member 135 rotates in one direction, the nut member 131 may move in an axial direction. When the nut member 131 presses the piston 121, the two brake pads 113 may press the brake disk 100 to brake the wheel. The operation in the parking release mode may be opposite to the operation in the parking operation mode.

Figure 6:
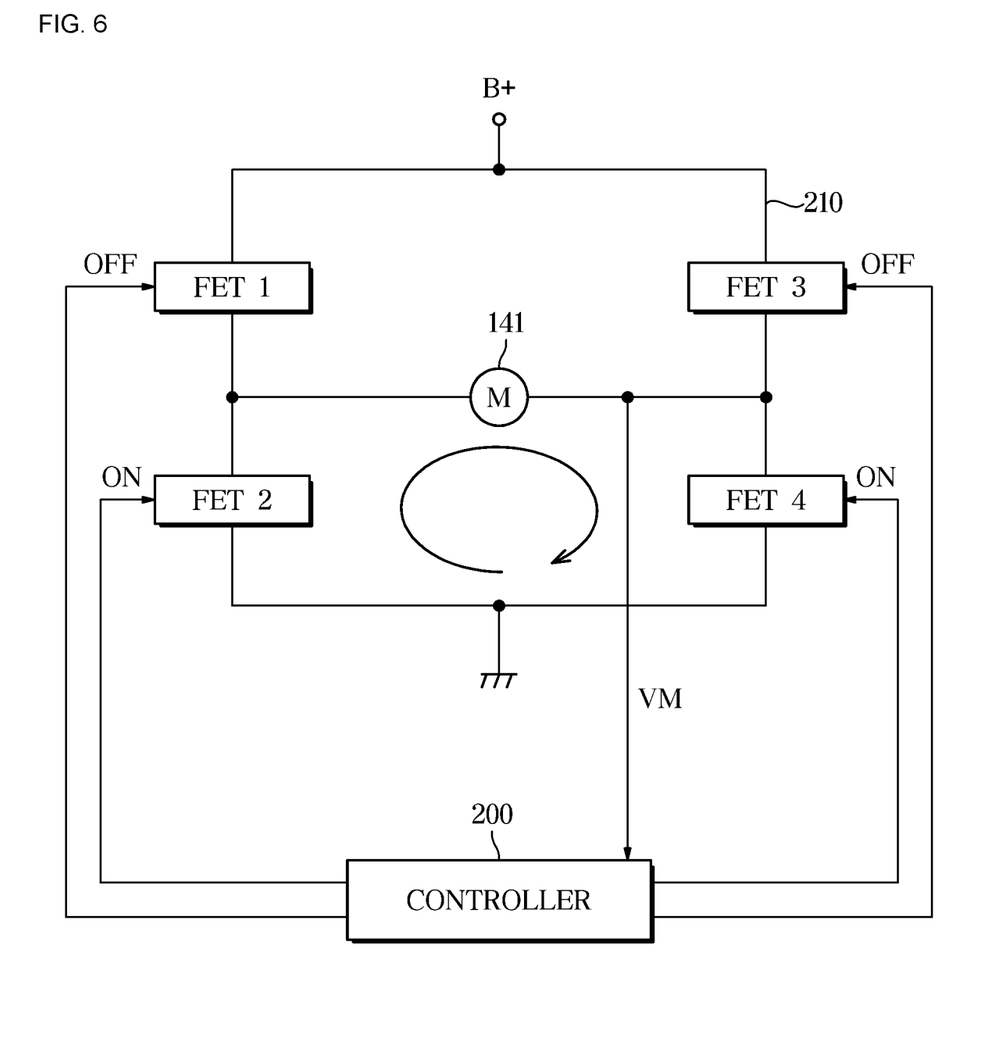
FIG. 6 is a circuit operation diagram when a motor lock is inspected in the electronic parking brake system according to an embodiment.

FIG. 6 is a circuit operation diagram when a motor lock is inspected in the electronic parking brake system according to an embodiment.

Referring to FIG. 6, in the motor lock inspection mode, the controller 200 operates the electric motor 141 in a free wheel state by turning off the first switching element FET1 and the third switching element FET3 on the high side of the H-bridge 210 and turning on the second switching element FET2 and the fourth switching element FET4 on the low side of the H-bridge 210. An arrow shown in FIG. 6 indicates a current flow flowing through the second switching element FET2, the electric motor 141, and the fourth switching element FET4. The direction of the arrow is indicated clockwise, but counterclockwise is also possible. On the other hand, the first switching element FET1 and the third switching element FET3 on the high side may be turned on, and the second switching element FET2 and the fourth switching element FET4 on the low side may be turned off.

Therefore, a winding of the electric motor 141 is short-circuited by the H-bridge 210 turning on only the elements on the high side or the low side, and the current is recirculated and slowly attenuated depending on an inductor/resistance time constant of the electric motor 141. Because this method short-circuits the back electromotive force of the electric motor 141, the electric motor 141 is rapidly braked. The recirculated current is dissipated as heat through a resistance of the inductor and a resistance of the two switching elements.

The controller 200 may recognize the voltage VM of the electric motor 141 by detecting a voltage from the winding of one side of the electric motor 141.

The controller 200 monitors the back electromotive force (back EMF) of the electric motor 141 in the motor lock inspection mode.

The controller 200 may determine the motor lock based on the back electromotive force of the electric motor 141 generated while the electric motor 141 operates in the free wheel state in the motor lock inspection mode.

The controller 200 may determine the motor lock based on a slope of the motor back electromotive force generated while the electric motor 141 operates in the free wheel state in the motor lock inspection mode.

Figure 7:
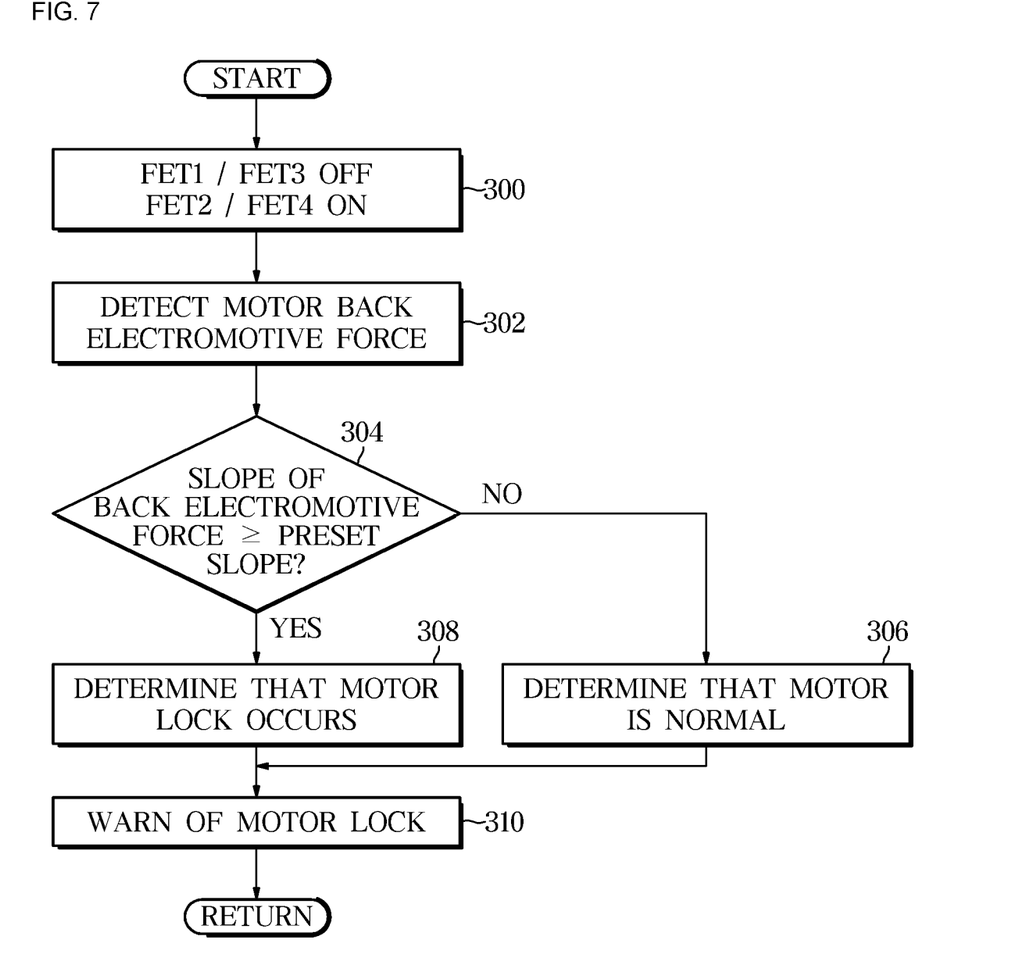
FIG. 7 is a flowchart of a control method of the electronic parking brake system according to an embodiment.

FIG. 7 is a flowchart of a control method of the electronic parking brake system according to an embodiment.

Referring to FIG. 7, a control method of the electronic parking brake system according to an embodiment may include turning off the first switching element FET1 and the third switching element FET3 on the high side of the H-bridge 210 and turning on the second switching element FET2 and the fourth switching element FET4 on the low side of the H-bridge 210 in order for the electric motor 141 to be in the free wheel when inspecting the motor lock (300), detecting the motor back electromotive force (302), determining whether the slope of the motor back electromotive force is equal to or greater than a preset slope (304), determining that the motor is normal when the slope of the motor back electromotive force is not equal to or greater than the preset slope (306), determining that the motor lock occurs when the slope of the motor back electromotive force is equal to or greater than the preset slope (308), and warning of the motor lock (310).

Figure 8:
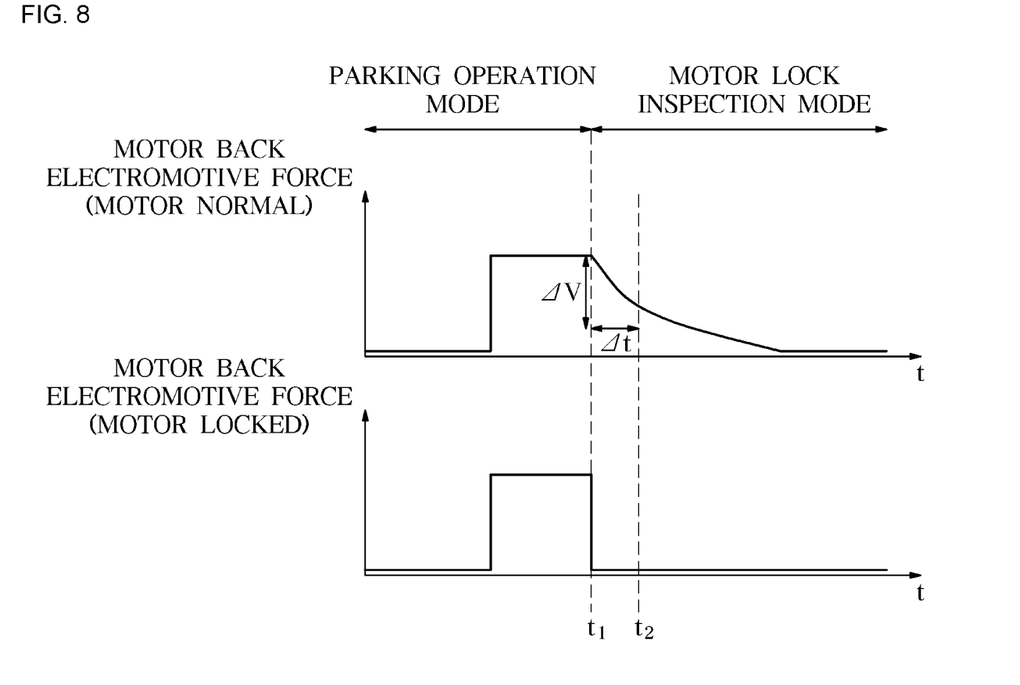
FIG. 8 is a graph illustrating a normal motor back electromotive force and a motor back electromotive force when the motor lock occurs in the electronic parking brake system according to an embodiment.

FIG. 8 is a graph illustrating a normal motor back electromotive force and a motor back electromotive force when the motor lock occurs in the electronic parking brake system according to an embodiment.

Referring to FIG. 8, the controller 200 converts the parking operation mode in which the electric motor 141 is driven or the parking release mode to the motor lock inspection mode in which the electric motor 141 operates in the free wheel state.

The controller 200 converts the parking operation mode or the parking release mode to the motor lock inspection mode by turning off the first switching element FET1 and the third switching element FET3 on the high side and turning on the second switching element FET2 and the fourth switching element FET4 on the low side.

When the controller 200 converts the parking operation mode or parking release mode to the motor lock inspection mode, in the cases of the normal state in which the electric motor 141 is not locked and the locked state in which the electric motor 141 is locked, the back electromotive forces of the electric motor 141 generated in the parking operation mode and the parking release mode appear differently. More specifically, the changes in the slopes of the back electromotive forces of the electric motor appear differently.

Because the electric motor 141 operates in the free wheeled state in the case of the normal state in which the electric motor 141 is not locked, the motor back electromotive force decreases relatively gently.

However, because the electric motor 141 does not operate in the free wheel state in the case of the state in which the electric motor 141 is locked, the motor back electromotive force decreases relatively steeply.

When a slope ΔV/Δt of the motor back electromotive force between a time point t1 and a time point t2 is greater than the preset slope, the controller 200 may determine that the motor lock occurs and determine as a motor lock failure. As such, the motor lock failure may be determined only by the slope of the motor back electromotive force without using a current sensor.

Figure 9:
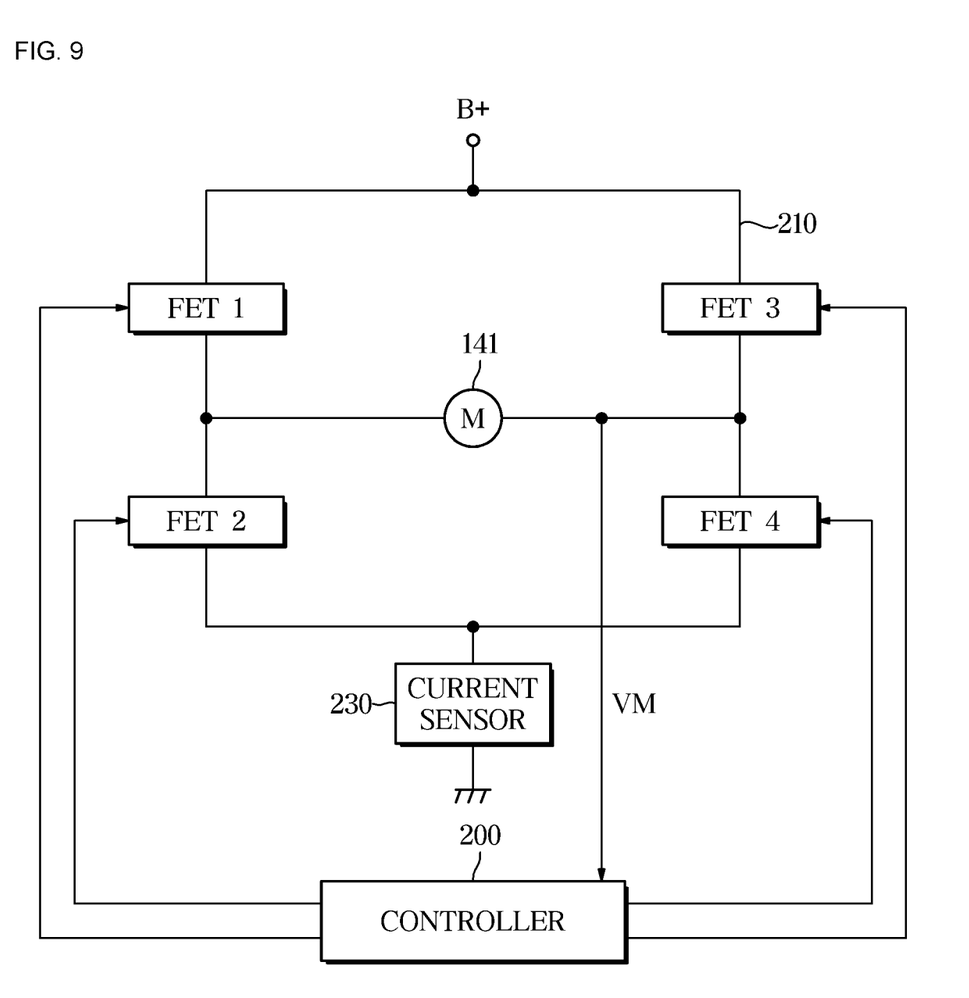
FIG. 9 is a circuit diagram for driving an EPB of an electronic parking brake system according to another embodiment.

FIG. 9 is a circuit diagram for driving an EPB of an electronic parking brake system according to another embodiment.

Referring to FIG. 9, the electronic parking brake system according to another embodiment may additionally include a current sensor 230 electrically connected to the input side of the controller 200.

The current sensor 230 may detect a current flowing through the electric motor 141 of the EPB 10. The current sensor 230 may detect a current supplied to the electric motor 141 from the motor power supply B+.

One side of the current sensor 230 is connected to a source terminal of the second switching device FET2 and the fourth switching device FET4 on the low side, and the other side of the current sensor 230 is grounded.

The current sensor 230 may detect a current on a circuit in which the current sensor 230 is installed by using a shunt resistor or a Hall sensor. The current sensor 230 may use various methods capable of detecting a motor current other than the shunt resistor or the Hall sensor. The current sensor 230 may transmit information on the detected current to the controller 200.

When the motor current detected through the current sensor 230 in the parking operation mode or the parking release mode is higher than a preset current, and the slope of the motor back electromotive force in the motor lock inspection mode is greater than the preset slope, the controller 200 may determine that the motor lock occurs and determine as the motor lock failure.

As is apparent from the above, according to an embodiment of the disclosure, a motor lock can be reliably detected without a current sensor, so that a product can be miniaturized and a manufacturing cost can be reduced.

Further, while the method of using the current sensor detects a motor lock only during motor operation, according to an embodiment of the disclosure, a situation in which the motor lock occurs immediately after the motor operation can be detected.

Further, according to another embodiment of the disclosure, when used with the current sensor, a failure can be detected more reliably.

What is claimed is:

1. An electronic parking brake system comprising:
a piston provided to press a pair of brake pads disposed on opposite sides of a brake disk rotating together with a wheel of a vehicle;
a nut member provided to press the piston;
a spindle member provided to move the nut member;
an electric motor provided to rotate the spindle member;
an H-bridge having a pair of high-side switching elements and a pair of low-side switching elements to rotate the electric motor in a forward or backward direction; and
a controller electrically connected to the H-bridge,
wherein the controller is configured to detect a back electromotive force of the electric motor in a motor lock inspection mode for inspecting a lock failure of the electric motor and determine the lock failure of the electric motor based on a change in the detected back electromotive force.

2. The electronic parking brake system according to claim 1, wherein
the controller is configured to selectively turn on any one of the pair of high-side switching elements and the pair of low-side switching elements of the H-bridge in the motor lock inspection mode so that a current circulates through the turned-on switching elements and the electric motor.

3. The electronic parking brake system according to claim 1, wherein
the controller is configured to initiate the motor lock inspection mode after completing driving of the electric motor for parking operation or parking release.

4. The electronic parking brake system according to claim 1, wherein
the controller is configured to determine as the lock failure of the electric motor when a slope of the detected back electromotive force is greater than a preset slope.

5. The electronic parking brake system according to claim 1, wherein
the controller is configured to, after completing driving of the electric motor for parking operation or parking release, selectively turn on any one of the pair of high-side switching elements and the pair of low-side switching elements, and at the same time detect the back electromotive force of the electric motor, and determine the lock failure of the electric motor based on the change in the detected back electromotive force.

6. A control method of an electronic parking brake system which comprises a piston provided to press a pair of brake pads disposed on opposite sides of a brake disk rotating together with a wheel of a vehicle, a nut member provided to press the piston, a spindle member provided to move the nut member, an electric motor provided to rotate the spindle member, and an H-bridge having a pair of high-side switching elements and a pair of low-side switching elements to rotate the electric motor in a forward or backward direction, the control method comprising:
detecting a back electromotive force of the electric motor in a motor lock inspection mode for inspecting a lock failure of the electric motor; and
determining the lock failure of the electric motor based on a change in the detected back electromotive force.

7. The control method according to claim 6, further comprising
selectively turning on any one of the pair of high-side switching elements and the pair of low-side switching elements of the H-bridge in the motor lock inspection mode so that a current circulates through the turned-on switching elements and the electric motor.

8. The control method according to claim 6, wherein
the detecting of the back electromotive force of the electric motor comprises initiating the motor lock inspection mode after completing driving of the electric motor for parking operation or parking release.

9. The control method according to claim 6, wherein
the determining of the lock failure of the electric motor comprises determining as the lock failure of the electric motor when a slope of the detected back electromotive force is greater than a preset slope.

* * * * *